United States Patent
Ebert

(10) Patent No.: US 6,439,084 B1
(45) Date of Patent: Aug. 27, 2002

(54) LAMINATED BLADE ASSEMBLY FOR CUTTING INSULATION

(75) Inventor: Michael J. Ebert, Sycamore, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 09/850,617

(22) Filed: May 7, 2001

(51) Int. Cl.[7] ................................................ H02G 1/12
(52) U.S. Cl. ......................... 81/9.41; 81/9.44; 30/90.1
(58) Field of Search ................................ 30/90.1, 90.4, 30/90.6; 81/9.4–9.44, 9.51

(56) References Cited

U.S. PATENT DOCUMENTS

| | | | |
|---|---|---|---|
| 2,523,936 A | | 9/1950 | Axelsen |
| 2,889,728 A | | 6/1959 | Hindenburg |
| 3,125,909 A | * | 3/1964 | Hindenburg ................ 81/9.42 |
| 3,336,666 A | | 8/1967 | Calkin |
| 3,735,649 A | * | 5/1973 | Staggs ........................ 81/9.42 |
| 4,246,808 A | | 1/1981 | Sandy et al. |
| 5,003,846 A | * | 4/1991 | Yagawa ...................... 81/9.42 |
| 6,089,125 A | * | 7/2000 | Cheng ........................ 81/9.44 |

* cited by examiner

Primary Examiner—James G. Smith
(74) Attorney, Agent, or Firm—Cook, Alex, McFarron, Manzo, Cummings & Mehler, Ltd.

(57) ABSTRACT

A laminated blade assembly including a stationary blade and a pair of insulation supports and a movable blade and a pair of insulation supports with each blade sandwiched between a pair of supports. Semi-circular grooves formed in the insulation supports and smaller semi-circular grooves formed in blades in alignment with the insulation support grooves creating circular grooves to support and cut the insulation when the stationary and movable blades come together. The support semi-circular grooves of one of the stationary and movable insulation supports are located with their peripheries tangent to a straight line which is not parallel to the center lines of the blade semi-circular grooves.

4 Claims, 6 Drawing Sheets

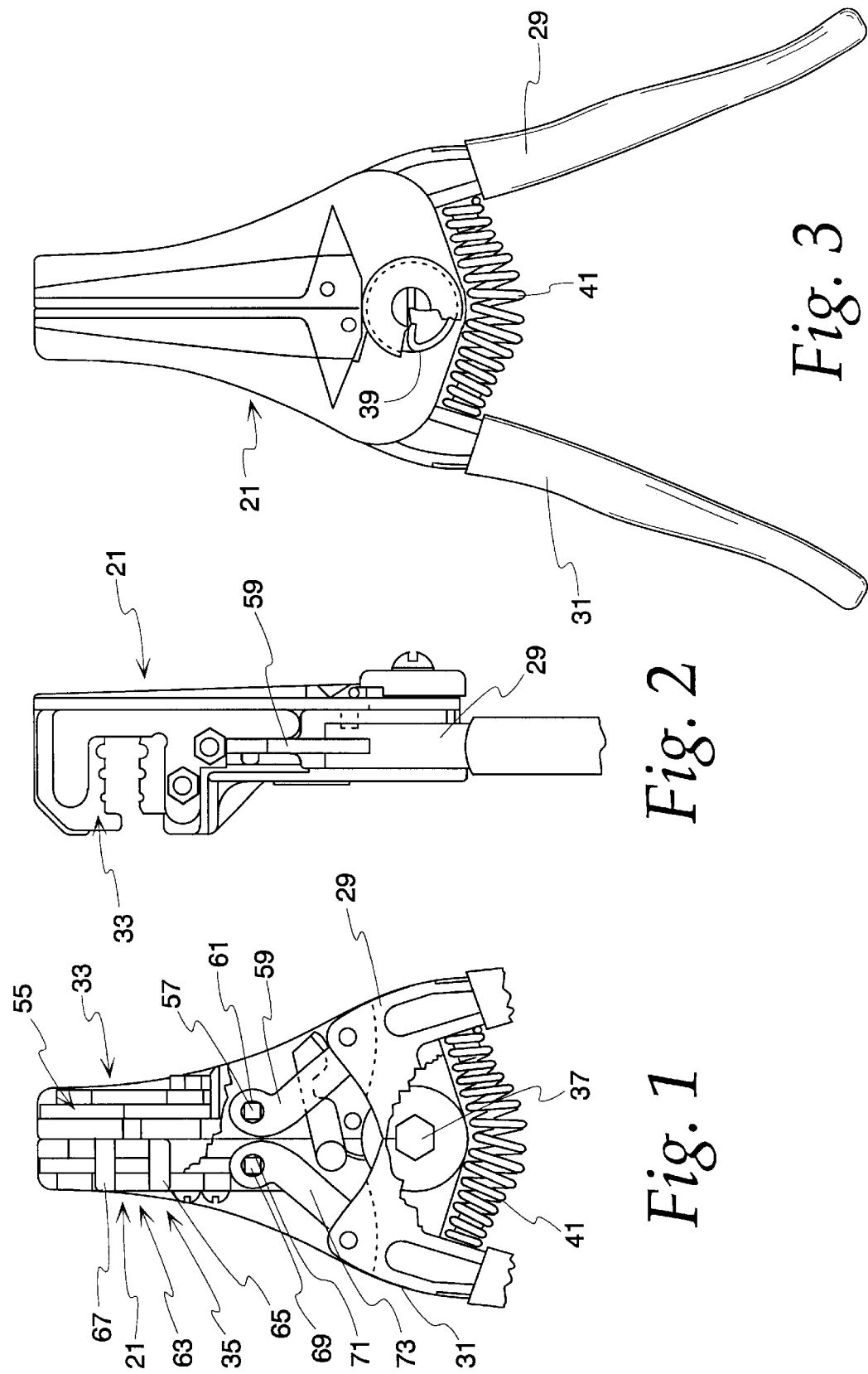

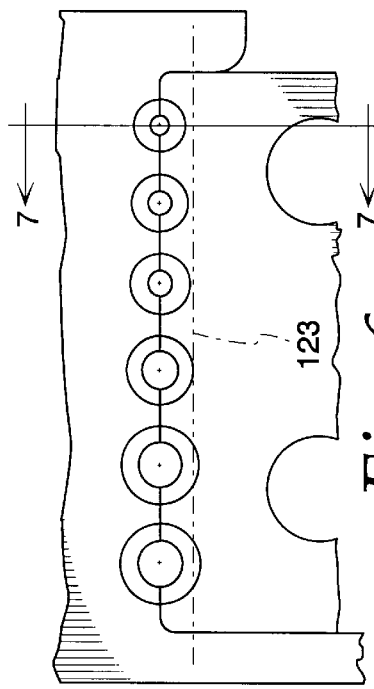
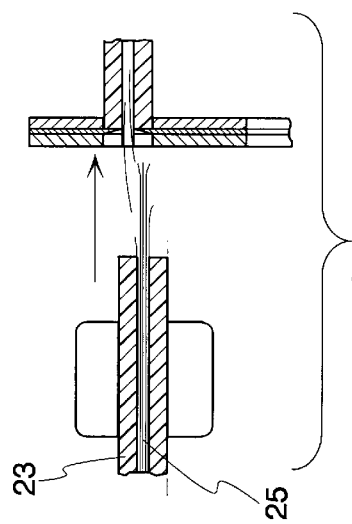
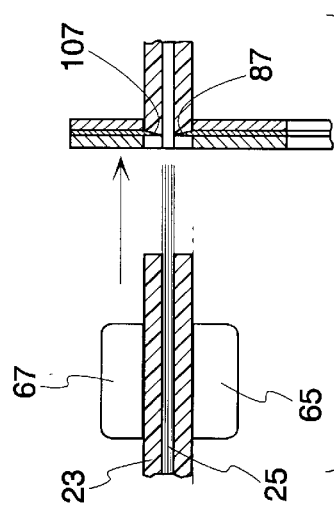
*Fig. 6*
*Prior Art*
*Fig. 7*
*Prior Art*
*Fig. 10*
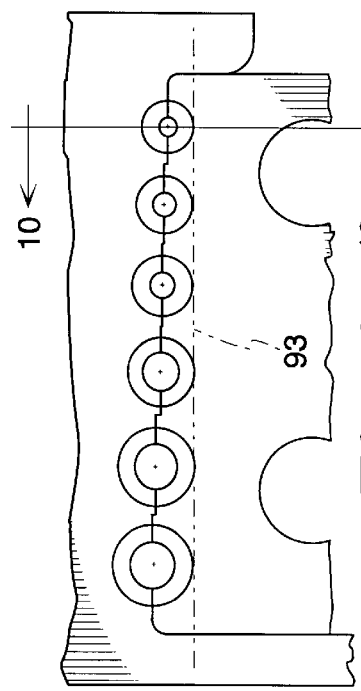
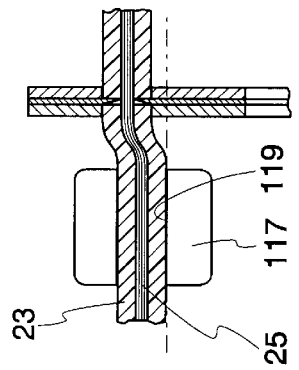
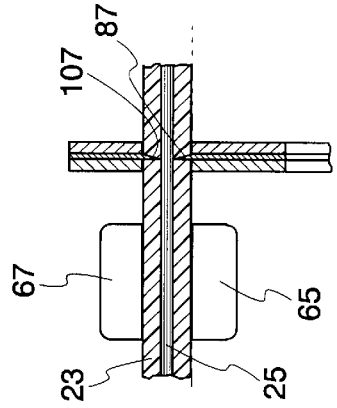
*Fig. 9*
*Fig. 8*
*Prior Art*
*Fig. 11*

LAMINATED BLADE ASSEMBLY FOR CUTTING INSULATION

BACKGROUND AND SUMMARY OF THE INVENTION

This invention is concerned with a blade assembly for a precision hand tool useful for stripping the insulation material from an insulated -wire. It is particularly concerned with blades for a tool used to strip insulation material from insulated wire.

An object of this invention is the removal of insulation from conductor wires with no damage to the conductor wires.

Another object of this invention is a laminated blade assembly for removing insulation from wires of different diameters while supporting the insulation of all of the wires, regardless of size, along a common plane during cutting.

Another object of this invention is a laminated blade assembly for removing insulation from wires of different diameters which blade assembly prevents bending of the insulation and its wire between the gripper and the cutting blades independently of the diameter of the particular wire whose insulation is being cut.

Another object of this invention is a laminated blade for removing insulation from an insulated wire, which blade provides a cleaner cut by eliminating pinching of the insulation during cutting.

Another object of this invention is a laminated blade assembly for cutting the insulation from insulated wires, which blade assembly reduces the amount of force needed to operate a hand operated insulation removing tool.

Another object of this invention is a laminated blade assembly for cutting insulation which reduces the force required to be applied to the operating handles sufficiently to permit the use of a material other than metal for the handles of such tools.

Other objects may be found in the following specification, claims and drawings.

BRIEF DESCRIPTION OF THE DRAWINGS

The invention is illustrated more or less diagrammatically in the following drawings wherein:

FIG. 1 is a: partial front elevational view of a hand operated insulated wire stripping tool which utilizes the blade assembly of this invention;

FIG. 2 is a partial side elevational view of the hand tool of FIG. 1;

FIG. 3 is a full rear elevational view of the hand operated insulated wire stripping tool of FIG. 1;

FIG. 6 is an enlarged, partial view of a prior art blade assembly;

FIG. 7 is an enlarged, partial, cross sectional view of a prior art insulated wire gripping and cutting blade assembly;

FIG. 8 is an enlarged, partial, cross sectional view of a prior art gripping and cutting blade assembly showing the separation of the cut insulation from the wire;

FIG. 9 is a view similar to that of FIG. 6 showing the insulated wire gripping and cutting blade of this invention;

FIG. 10 is a view similar to that of FIG. 7 showing the insulated wire gripping and cutting blade of this invention;

FIG. 11 is a view similar to that of FIG. 8 showing the insulated wire gripping and cutting blade assembly of this invention;

Description of the Preferred Embodiment

Figure 4:
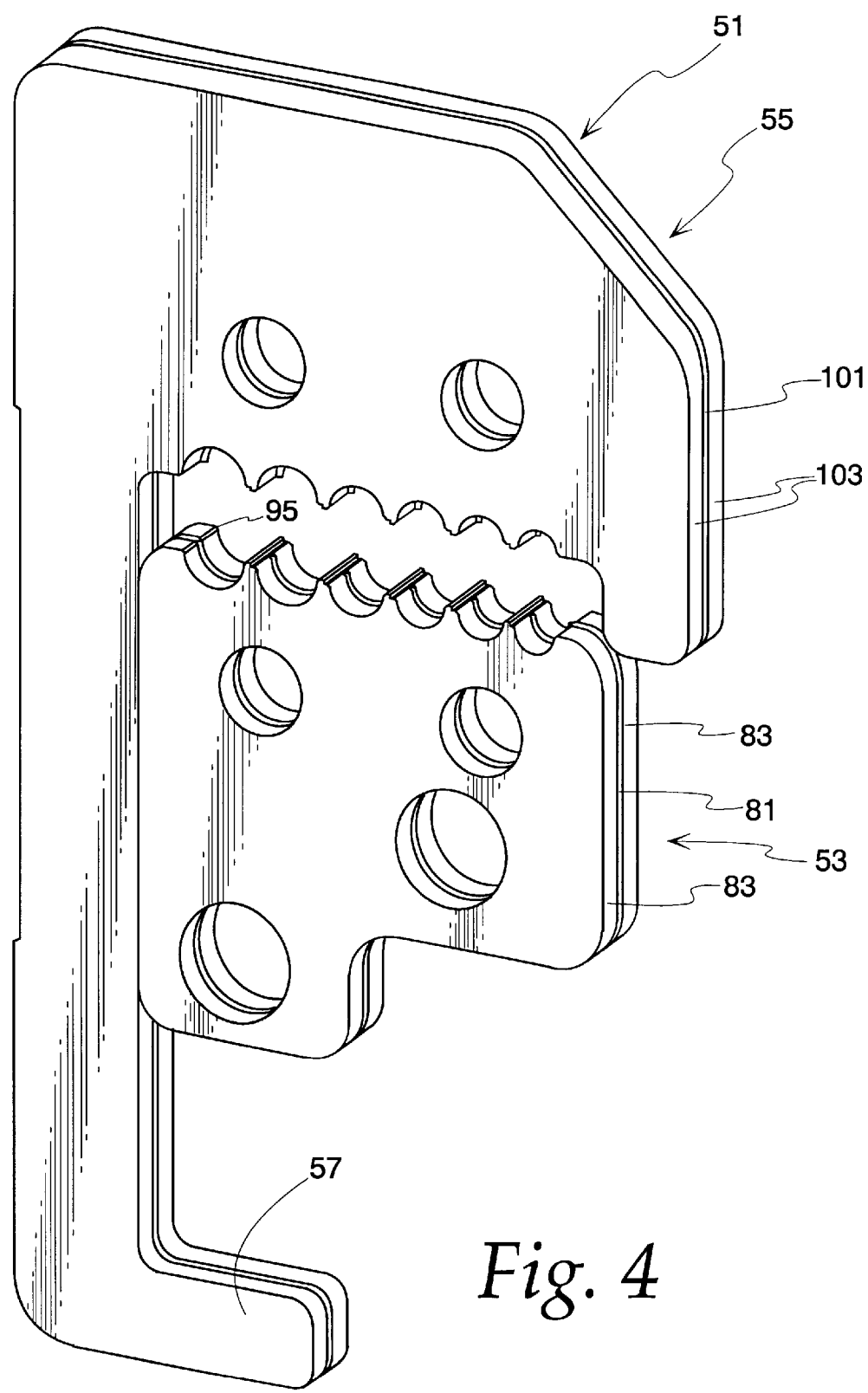
FIG. 4 is an enlarged, perspective view of a blade assembly of this invention.

FIGS. 1–3 of the drawings show a hand tool 21 of the type which is used for stripping insulation 23 from conductor wires 25. Hand tools of this general type are shown in U.S. Pat. Nos. 2,523,936 and 2,889,728 which are owned by the same assignee as the assignee of this specification. Said patents are incorporated by reference to this application for all purposes and specifically to show the operation of said hand tools to cut the insulation and remove the cut sleeve of insulation from a conductor wire.

Hand tool 21 includes handles 29 and 31. The handle 29 is shown as the right side handle and the handle 31 as the left side handle of the tool 21 as viewed in FIG. 1 of the drawings. The hand tool 21 also includes a head cutter assembly 33 and a head clamp assembly 35, both of which are mounted on a pivot shaft 37 for rotation relative to each other. A torsion spring 39 is mounted around the pivot shaft 37 and a compression spring 41 is provided between the handles 29 and 31. Because this invention is directed to improvements in the cutting blade and insulation supports, details of the actual operation of the hand tool 21, except when necessary to indicate the best mode of use of this invention, will not be described but instead reference is made to U.S. Pat. Nos. 2,523,936 and 2,889,728 which contain a complete description of the use and operation of such a hand tool. Initial movement of the handles 29 and 31 towards each other and about the pivot shaft 37 brings about a grasping of the wire insulation by the head clamp assembly 35 and cutting of the insulation by the head cutter assembly 33. Continued motion of the handles toward each other further results in a separating movement of the head cutter assembly 33 and head clamp assembly 35 from each other along an arc about the pivot shaft 37 and in opposite directions from the movement of the handles 29 and 31 toward each other. This action cuts the insulation from the wire and removes the cut sleeve of insulation from the wire as clearly described in said '936 and '728 patents.

Figure 5:
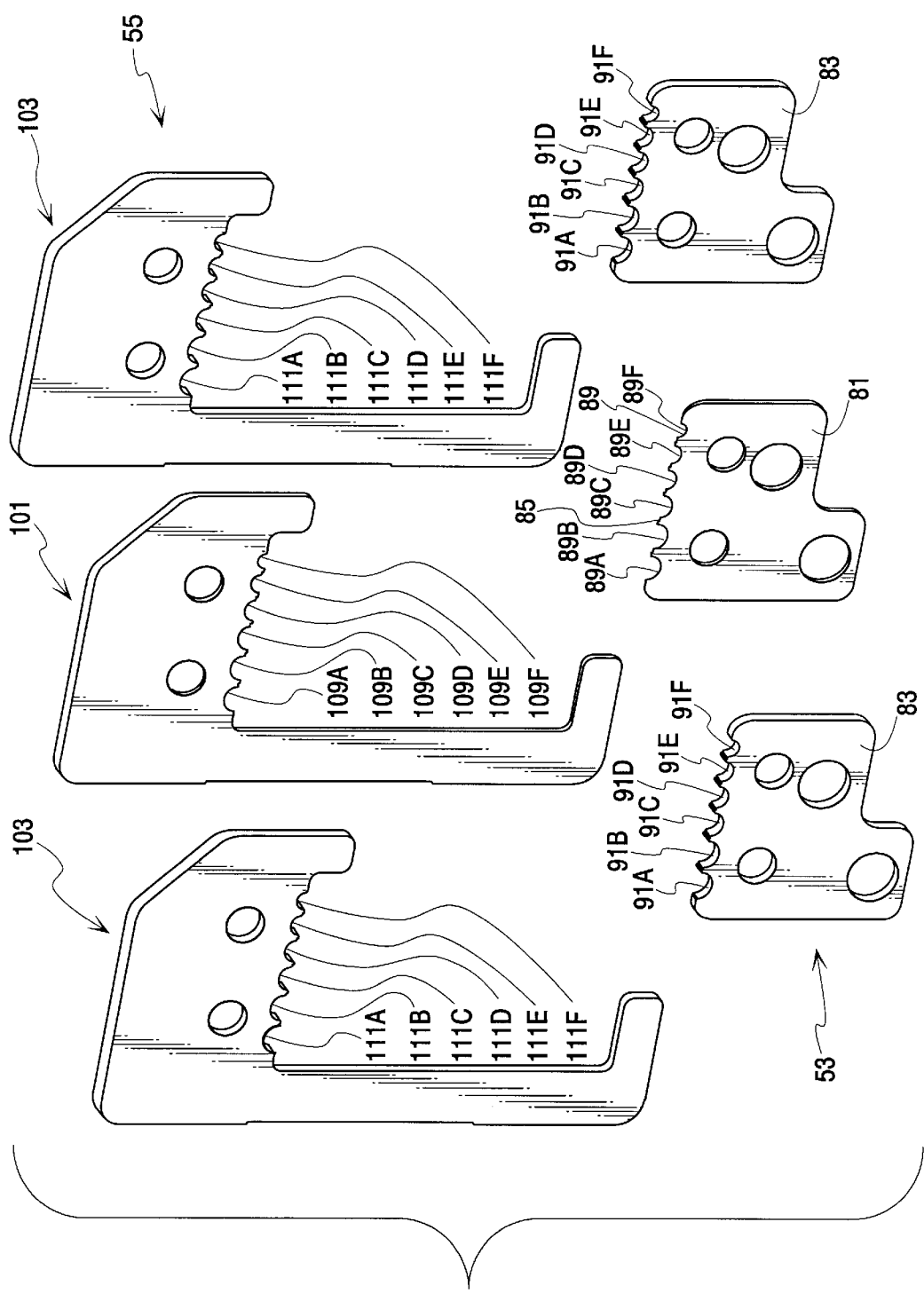
FIG. 5 is an exploded view of the blade assembly of FIG. 4.

One novel aspect of this invention is found in the cutter blade assembly 51 which is shown assembled in an open position before placement of the insulated wires for cutting in FIG. 4 and in an exploded view in FIG. 5 of the drawings. The assembly 51 includes a fixed cutter blade laminate 53 which is attached to the head cutter assembly 33 with the attachment means omitted for clarity of illustration and a movable cutter blade laminate 55 which has a foot 57 which connects to a link 59 (FIG. 1) connected to the handle 29 through an opening 61 formed in one end of the link 59. The other end of the link 59 is connected to the handle 29. Continued movement of the handle 29 toward the handle 31 moves the movable cutter blade laminate into contact with the fixed cutter blade laminate.

Mounted on the head clamp assembly 35 is a clamp mechanism 63 which includes a fixed clamp 65 attached to the head clamp assembly 35. A movable clamp 67, shown in FIG. 1, has a foot 69 similar to foot 57 of the movable cutter blade which fits into an opening 71 in link 73 which is connected to handle 31. Movement of the handle 31 toward the handle 29 moves the movable clamp 67 toward the fixed clamp 65. This mode of operation is described in said '936 and '728 patents.

Referring specifically to FIGS. 4 and 5 of the drawings, the fixed cutter blade laminate 53 includes a very thin cutter blade 81 laminated between a pair of insulation support members 83. The cutting blade may be made of a thin blade quality steel having a beveled cutting edge 85 which has an inclined surface 87 positioned to face away from the clamps 65 and 67 when the blade is installed in the tool 21 (see FIGS. 9, 10 and 11). A series of semi-circular notches 89 are formed in the cutting edge of the cutting blade. These semi-circular notches may vary in radius depending on the gauge of the wire whose insulation is to be cut. Conventionally, these notches may vary in radius from the largest radius at one end to the smallest radius at the other and in this embodiment of the invention are indicated by letters A, B, C, D, E and F. These semi-circular notches cooperate with similar radius notches in the movable cutter blade laminate 55 to form a series of circular notches each smaller in diameter than the insulation of the wire to be inserted in the notch but slightly larger than the diameter of the wire so as that the insulation can be cut through without damaging the wire. The insulation support members 83 are each formed with a similar series of semi-circular notches 91 of varying radii decreasing in size from the largest radius at one end to the smallest radius at the other with each radius of the wire insulation support member having a larger radius than its corresponding cutting blade notch 89. The insulation support members support the insulation of the wire while it is being cut.

The fixed cutter blade laminate 53 and the movable cutter blade laminate 55 are each held together by pins (not shown) which will be press fitted into the unnumbered circular openings formed in the cutting blades 81 and 101 and the insulation support members 83 and 103. The pins and holes will provide the very accurate alignment required to provide tight blade tolerances. The older method of attachment using bolts and nuts is shown and described in said '936 and '728 patents.

Figure 14:
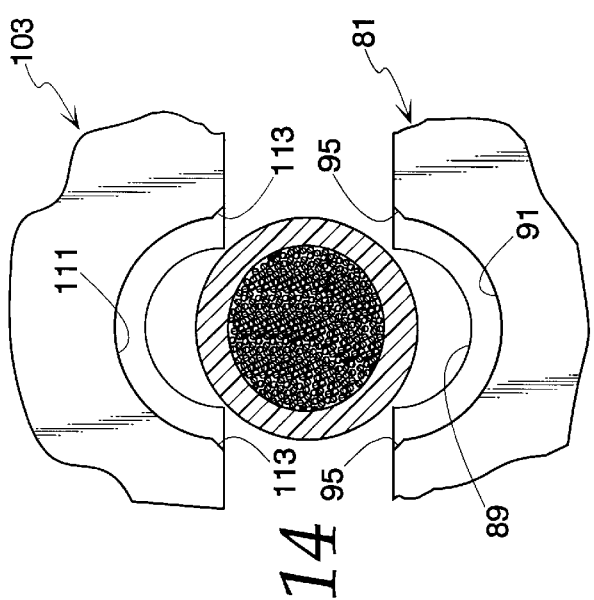
FIG. 14 is an enlarged, partial view of the cutting blades of this invention prior to the cutting of the wire insulation.

As can best be seen in FIGS. 9, 10 and 11 of the drawings, the lower periphery of each insulation support notch 91 is tangent to a base line 93 which aligns with the upper surface of the fixed clamp 65. With this arrangement, the notches 91 support the insulation of each wire in alignment with the insulation being supported by the fixed clamp 65 at the time of cutting of the insulation. As shown most clearly in FIGS. 4, 14 and 15 of the drawings, the edges of the notches at the entrances to the semi-circular notches 91 are chamfered at 95 to prevent pinching of the insulation of the wires as they are clamped by the cutting blade assembly 51. In contrast, the prior art cutting blade assembly shown in FIGS. 12 and 13 pinches the insulation of the wires as the insulation is cut.

The movable cutter blade laminate 55 shown in FIGS. 4 and 5 includes a cutter blade 101 similar to blade 81 sandwiched between a pair of insulation support members 103. The cutting edge of the cutter blade 101 is beveled (see FIGS. 10 and 11) to provide an inclined side wall 107 facing away from the clamps 65 and 67. A series of semi-circular notches 109 similar in size and numbers to the notches 89 are formed in the cutting edge 105 of the cutting blade member 101. Semi-circular insulation support notches 111 similar to the previously described notches 91 are also formed in the insulation support members 103 and indicated by the letters A, B, C, D, E and F varying from the largest radius to the smallest radius with each notch 111 having a larger radius than that of its corresponding cutting blade notch 109. Chamfers 113 are formed on the edges of the notches 111 at the openings into the notches to prevent pinching of the insulation during cutting.

FIGS. 6, 7 and 8 of the drawings illustrate the problems which can occur during the cutting of the insulation 23 of a wire 25 using a typical prior art insulation cutting tool. As can be seen in FIG. 6, the centers of the circular cutting notches and their insulation support notches of the cutting blade assembly are aligned. Because the blade assembly of the tool is built to cut the insulation of wires of different gauges, the alignment of the centers of the cutting notches results in the outer peripheries of the insulation support notches being out of alignment. In such prior art tools, the upper surface 117 of the fixed lower clamp 119 was aligned with only one of the insulation support notches, usually one of the cutting notches near the center of the tool such as insulation support notch 121C shown in FIG. 6. The phantom line 123 in FIG. 6 shows the projection of the upper surface 117 of the fixed lower clamp and indicates that it aligns only with the lower periphery of the insulating support notch 121C.

Using such a tool to cut the insulation of a wire positioned in a notch such as cutting notch 121F as shown in FIGS. 7 and 8 of the drawings, results in bending of the wire 25 and its insulation. The clamp 119 supports the insulation of the wire at a different level than the insulation is being supported by the insulation support notch 121F of the cutting blade assembly. The bending of the wire and its insulation during cutting of the insulation results in damage to the wire when a sleeve 125 of detached insulation is removed from the wire as shown in FIG. 8 of the drawings.

In this aspect of the invention, the upper surface of the fixed clamp 65 defined by the phantom line 93 shown in FIG. 9 is aligned with all of the lower peripheries of the semi-circular insulation support notches 91 from A to F. Therefore, as shown in FIG. 10, when the blades 81 and 101 cut the insulation 23 of the wire 25, the insulation of wires of all sizes will be supported at the same level no matter what the diameter of the wire. Accordingly, the wire and its insulation will not be bent during severing and insulation removal thus providing a clean cut as shown in FIG. 11 of the drawings. The edges of the cutting blades 81 and 101 and the similar edges of the insulation support members 83 and 103 are stepped as shown in FIG. 9 to accommodate the non-alignment of the centers of the notches.

Figure 15:
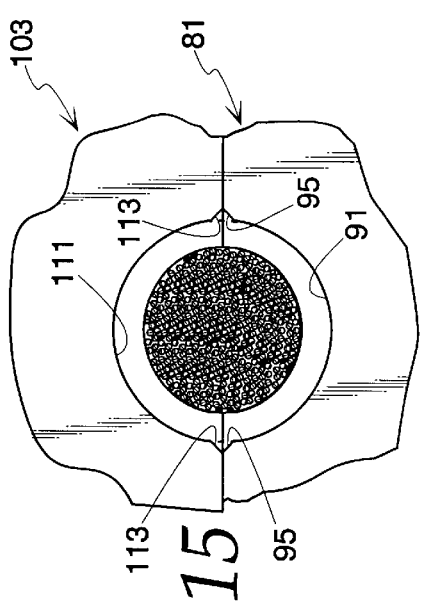
FIG. 15 is an enlarged, partial view of the cutting blades of this invention at the completion of the cutting of the wire insulation.
Figure 12:
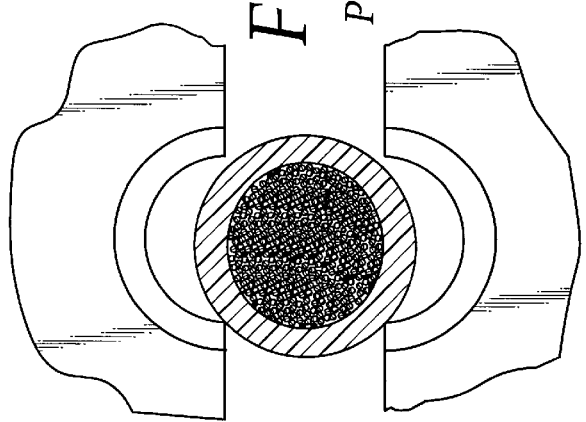
FIG. 12 is an enlarged, partial view of prior art cutting blades prior to the cutting of the wire insulation.
Figure 13:
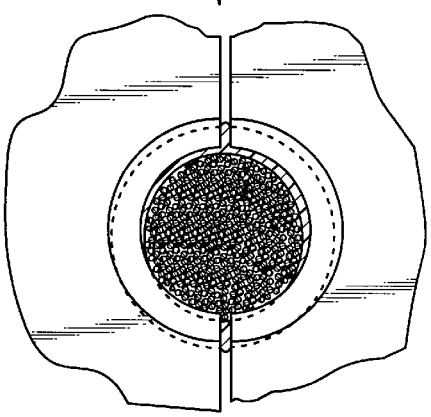
FIG. 13 is an enlarged, partial view of prior art cutting blades at the completion of the cutting of the wire insulation.

FIGS. 12 to 13 of the drawings show the cutting edges of the blades of the prior art engaging the insulation as shown in FIG. 12 with the final cut shown in FIG. 13. However, during this cutting, the insulation support member 83 squeezes the outer edge of the insulation as the cutting is completed in the manner shown in FIG. 13. With the chamfers 95 and 113 on the insulation support members 81 and 103, respectively, shown in FIGS. 14 and 15, clearance is provided for the insulation of the wire and squeezing of the external surface of the insulation is avoided when the cutting blade members and clamping members come together as shown in FIG. 15 of the drawings.

Figure 16:
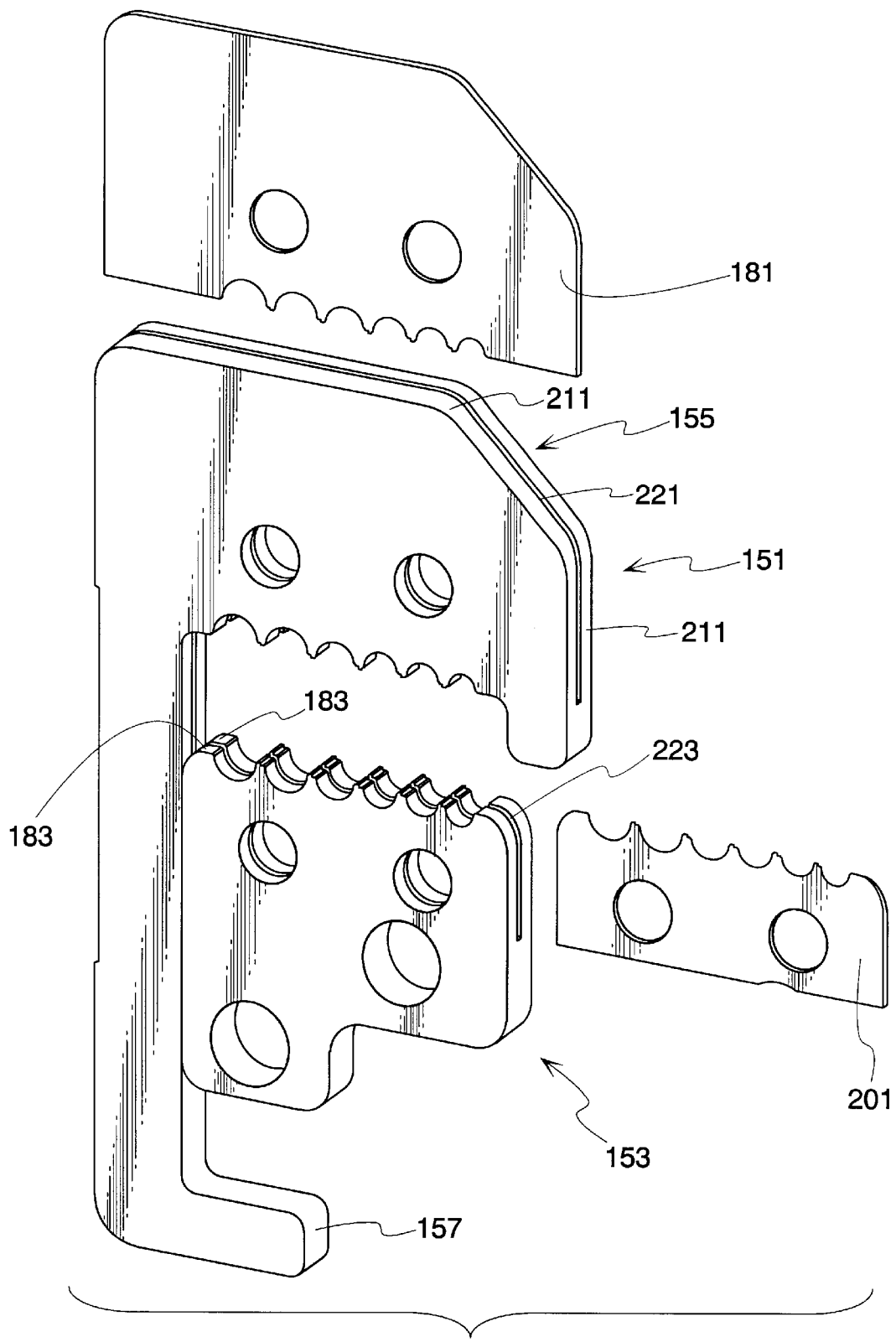
FIG. 16 is an exploded view of a second embodiment of an insulated wire gripping and cutting blade assembly of this invention.

A modified cutter blade assembly 151 is shown in an exploded view in FIG. 16 of the drawings. The blade assembly 151 includes a fixed cutter blade laminate 153 and a movable cutter blade laminate 155. The fixed cutter blade laminate 153 and the movable cutter blade laminate 155 are adapted to be attached to the head cutter assembly 33 with the attachment means omitted for clarity of illustration. The movable cutter blade laminate 155 includes a foot 157 which connects to a link 59 (FIG. 1) which in turn is connected to a handle 29 through an opening 61 formed in one end of the link 59. The movable cutter blade laminate 155 operates in the same manner as the movable cutter blade laminate 55 described in connection with the operation of the first embodiment of this invention.

The modified cutter blade assembly 151 of this embodiment of the invention differs from the cutter blade assembly 51 previously described in connection with the embodiment of the invention of FIGS. 1–15 in that the insulation support members 183 of the fixed cutter blade laminate 153 and the insulation support members 211 of the movable cutter blade laminate 155 are each formed in a single unitary piece of metal instead of being formed as a pair of insulation support members attached together on opposite sides of the blade as described in the embodiment of FIGS. 1–15. To accommodate the thin cutting blades 181 and 201, thin pockets 221 and 223, respectively, are formed in the insulation support members 183 and 211 by an electron discharge machining process (EDM) which removes the metal of the support members 183 and 211. The pockets 211 and 223 open outwardly to receive the movable blade 181 and the fixed blade 201. The blades are held in aligned positions in the pockets by pins which are press fitted into circular openings formed in the insulation support members 183 and 211 as well as in the blades 181 and 201. These pins are omitted from the drawings of this specification for clarity of illustration but the older nut and bolt fasteners are shown and described in said '936 and '728 patents.

The arrangement and construction of the notches, both in the cutting blades 181 and 201 and in the insulation support members 183 and 211, are the same as described in connection with the embodiment of the invention of FIGS. 1–15 of this specification. Thus, the modified cutter blade assembly 151 herein described provides all of the advantages previously described for the cutter blade assembly 51 and, in addition, provides ease of assembly and better alignment of the support grooves 91 and 111 of the insulation support members 183 and 211. The forming of the insulation support members 183 of the fixed cutter blade laminate 153 and the insulation support members 211 of the movable cutter blade laminate 155 each of a single unitary piece of metal protects their respective cutting blades 181 and 201 because the unitary pieces of metal are less likely to break during use than are the two piece insulation support members 83 and 103 of the first embodiment of this invention.

What is claimed is:

1. A laminated blade assembly for cutting the insulation of a wire to permit removal of said insulation, said blade assembly including:

a stationary member and a movable member which members are formed to contact each other when moved together to cut said insulation, each of said stationary and said movable members including a blade and a pair of wire insulation supports with said blade sandwiched between said supports, each of said supports having an edge of generally rectangular cross section facing a similar edge of a similar support of said other member, a plurality of semi-circular grooves formed in each of said support edges with said grooves extending transversely of said support edges, said grooves being spaced apart from one another longitudinally of said edges, said support grooves of similar diameters aligned with one another, said support grooves forming circular grooves to receive said insulation of said wires when said stationary and said movable members are moved together to cut said insulation, each of said blades having a sharpened longitudinally extending edge facing a similar sharpened longitudinally extending edge of said other blade, and a plurality of semi-circular grooves formed in each of said sharpened edges with said blade grooves extending transversely of said edges, said blade grooves being arranged apart from one another along said sharpened edge so as to align with similar aligned grooves in said supports, each of said blade grooves having a smaller diameter than the support groove with which it is aligned to provide a blade groove extending into its aligned support grooves, said semi-circular support grooves being chamfered along opposite lateral sides at said support edges.

2. The laminated blade assembly of claim 1 in which said sharpened longitudinally edges and said blade grooves are beveled with said bevels facing said end of said wire over which said insulation is removed.

3. A laminated blade assembly for cutting the insulation of a wire to permit removal of said insulation, said blade assembly including:

a stationary member and a movable member which members are formed to contact each other when moved together to cut said insulation, each of said stationary and said movable members including a blade and a pair of wire insulation supports with said blade sandwiched between said supports, each of said supports having an edge of generally rectangular cross section facing a similar edge of a similar support of said other member, a plurality of semi-circular grooves formed in each of said support edges with said grooves extending transversely of said support edges, said grooves being spaced apart from one another longitudinally of said edges, said support grooves of similar diameters aligned with one another, said support grooves forming circular grooves to receive said insulation of said wires when said stationary and said movable members are moved together to cut said insulation, each of said blade s having a sharpened longitudinally extending edge facing a similar sharpened longitudinally extending edge of said other blade, a plurality of semi-circular grooves formed in each of said sharpened edges with said blade grooves extending transversely of said edges, said blade grooves being arranged apart from one another along said sharpened edge so as to align with similar aligned grooves in said supports, each of said blade grooves having a smaller diameter than the support groove with which it is aligned to provide a blade groove extending into its aligned support grooves, said support grooves of one of said stationary and said movable members are located with their peripheries tangent to a straight line which is not parallel to the center lines of said cutter blades semi-circular grooves.

4. A laminated blade assembly for cutting the insulation of a wire to permit removal of said insulation over an end of said wire, said blade assembly including:

- a stationary member and a movable member which members are formed to contact each other when moved together to cut said insulation,
- each of said stationary and each of said movable members formed of a unitary piece of metal having a wire support edge of generally rectangular cross section, said support edges of each of said members facing each other, an opening formed in each support edge with each opening extending longitudinally of its support edge and into its said member to form a narrow blade pocket, each of said openings dividing each of said support edges into a pair of oppositely located wire insulation support edges,
- a plurality of semi-circular grooves formed in each of said pair of edges with said grooves extending transversely of each of said pair of edges,
- said grooves being spaced apart from one another longitudinally of said edges,
- said support grooves of similar diameters aligned with one another,
- a blade positioned in each of said blade pockets,
- each of said blades having a sharpened longitudinally extending edge facing a similar sharpened longitudinally extending edge of said other blade, and
- a plurality of semi-circular grooves formed in each of said sharpened edges with said blade grooves extending transversely of said edges,
- said blade grooves being arranged apart from one another along said sharpened edge so as to align with similar aligned grooves in said supports,
- each of said blade grooves having a smaller diameter than the support groove with which it is aligned to provide a blade groove extending into its aligned support grooves,
- said sharpened longitudinally extending edges and said blade grooves being beveled with said bevel facing said end of said wire over which said insulation is removed.

* * * * *